June 29, 1954  T. E. BROWN  2,682,417
WAGON CHASSIS FRONT END STRUCTURE
Filed April 6, 1953

Witness
Edward P. Seeley

Inventor
Theodore Everett Brown
by M. Talbert Dief
Attorney

Patented June 29, 1954

2,682,417

UNITED STATES PATENT OFFICE 2,682,417

WAGON CHASSIS FRONT END STRUCTURE

Theodore Everett Brown, Bedford, Iowa

Application April 6, 1953, Serial No. 347,058

4 Claims. (Cl. 280—116)

My invention is a novel structure for the front end of a wagon chassis.

Wagon chassis have been known a long time, of course, and there have been numerous different forms of wagon running gear constructed. In years past, however, wagon chassis were constructed mainly of wood. Only the bolts and like fastening means and necessary hardware were made of metal. In the last several decades, there has been a trend toward making wagon chassis of metal. This fact has nearly made a new art of the wagon chassis field, because when metal is used, a rather different form of structure is possible. Because less bulky forms of wagon chassis are possible, there have been numerous alterations in the customary wooden construction, and my new wagon box is one of these.

It is the principal object of my invention to provide a wagon chassis front end that greatly facilitates the assembly of a wagon chassis during manufacture.

It is a further object of my invention to provide a wagon chassis front end that greatly facilitates shipping the wagon chassis.

It is a further object of my invention to provide a wagon chassis front end that is extremely simple in design and therefore provides an economical though strong chassis structure.

It is a further object of my invention to provide a wagon chassis front end that increases the flexibility of the use of the running gear to the purchaser.

It is a further object of my invention to provide a wagon chassis front end that is durable in use and refined in appearance.

These and other objects will be apparent to those skilled in the art.

Figure 1:
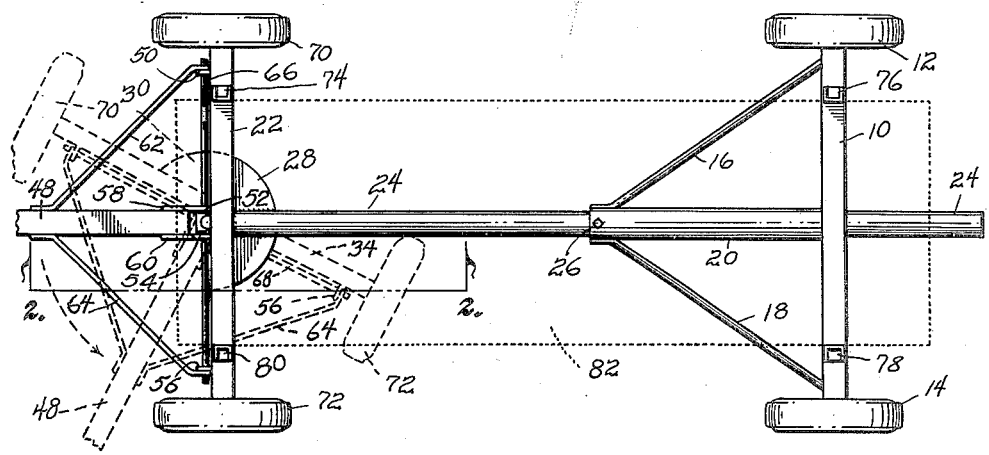
Figure 2:
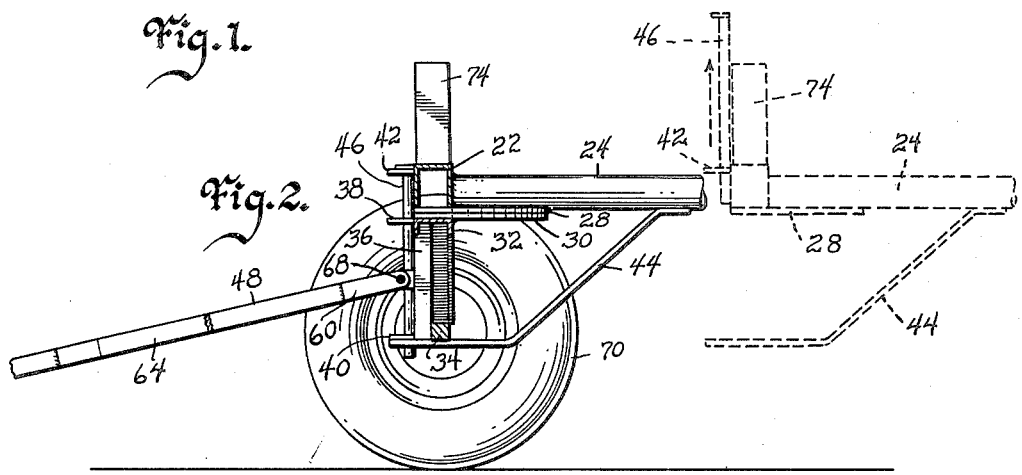
Figure 3:
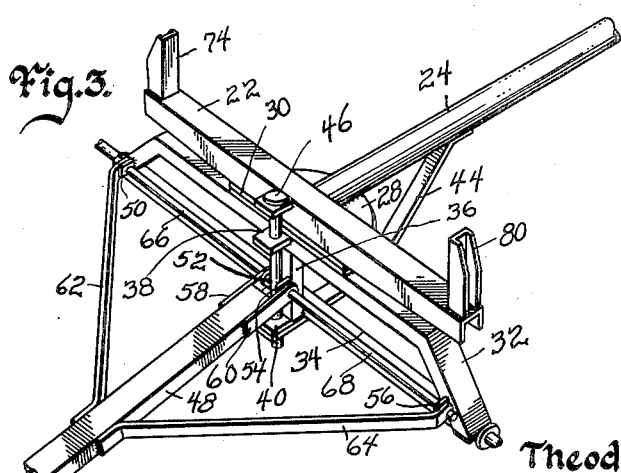

My invention consists in the construction, arrangement and combination of the various parts of the device whereby the objects contemplated are attained as hereinafter more fully set forth, pointed out in my claims, and illustrated in the accompanying drawings in which:

Fig. 1 is a plan view of a wagon chassis of which the front end is my invention; broken lines illustrate an adjusted position, Fig. 2 is an enlarged longitudinal sectional view of my wagon chassis front end taken on the line 2—2 of Fig. 1; broken lines illustrate how the front end may be separated from the balance of the chassis, and Fig. 3 is an enlarged perspective view of the bolster and front axle assembly of my wagon chassis front end.

Referring to the drawings I have used the numeral 10 to designate the rear bolster to which the rear axle (not shown) is appropriately secured. The wheels 12 and 14 are rotatably secured to the axle, and radius rods 16 and 18 are secured to the rear axle at one end and to the forward end of the frame tube designated 20. The front bolster 22 is secured to the frame element designated 24 which I call the torque tube. It is of an outside diameter slightly less than the inside diameter of the frame tube 20 and is slidably received therein. Any suitable means is provided to secure the torque tube in the frame tube such as the bolt 26. If desired a plurality of holes may be provided in the torque tube which will allow the effective length of the chassis, that are between the bolsters to be adjusted. These holes are not shown, and their provision is thought to be within the ability of one skilled in the art.

Under the front bolster, I secure a semi-circular unbroken bearing plate designated 28 which serves as a bearing surface against which similar plate 30 bears. Plate 30 is secured to the axle bridge 32 to which the axle 34 is secured. The numeral 36 designates a vertical post secured to and between the axle 34 and the bridge 32. The bridge and the vertical post 36 each have horizontally extending pierced bearing ears secured to them and designated 38 and 40 respectively. A similar pierced bearing ear designated 42 is secured to the front bolster. The numeral 44 designates a brace bar that is secured to the torque tube by one of its ends and extends down and forward therefrom to a pierced forward end that is below the axle 34 and has its pierced end aligned with bearing ear 40. When all of the bearing ears are aligned, the pin 46 can be inserted through them and through the hole in brace bar 44 to secure the front axle pivotally to the front bolster. As shown in Fig. 1 the front axle assembly can then pivot about the pin to provide the chassis with turning action.

A tongue 48 is secured to the front axle assembly. The numerals 50, 52, 54 and 56 designate four vertically arranged pierced bearing ears secured to the bridge and the vertical post 36. They are numbered from top to bottom in Fig. 1 and left to right in Fig. 3. A pair of pierced fingers 58 and 60 are secured to the rear of tongue 48 and extend adjacent to the ears 52 and 54 as shown in Fig. 3. A pair of diagonal brace bars are secured to the tongue at a point spaced from the rear end thereof, and these bars are designated 62 and 64. Separate hinge rods 66 and 68 extend through the aligned bearing elements 52, 58, 58 and 62; and 54, 60, 54 and 64 respectively. The tongue is held against all movement relative to the front axle, therefore, except as to pivoting in a vertical arc. The front wheels are designated by the numerals 70 and 72. The numerals 74, 76, 78 and 80 designate the four vertical corner posts that are secured to the bolster ends front and back. Between these posts a wagon box is secured as shown by the dotted lines in Fig. 1.

The advantages of my structure are numerous. It is clear that all of the various portions of the chassis can be fabricated separately and then easily and quickly assembled into a complete chassis. It is also clear that with little or no effort the front wheels can be removed and the chassis parts can then be nested into a railway freight car in close order. A large number of the wagons thus partially disassembled could be packed into a single freight car in this manner. When the wagons reach their destination, it is a job involving only minutes to reassemble the front wheels onto the chassis thus permitting it to be towed away on its own wheels. Also, of course, the ultimate owner may well desire to use the front wheels alone as a trailer for a very long lumber or the like. My front end structure permits the front wheels to be removed easily and used for such purposes. Also, of course, if any portion of the wagon is in need of repair and which the farmer is incapable of completing himself, the portion of the chassis requiring repair work can be removed and more easily taken to a repair shop. Obviously I have invented a structure that accomplishes the objects of my invention.

Some changes may be made in the construction and arrangement of my wagon chassis front end structure without departing from the spirit and purpose of the invention, and it is my intention to cover by my claims, any modified form of structure or use of mechanical equivalents which may be reasonably included within their scope.

I claim:

1. In a wagon chassis, an axle, an axle bridge secured to the axle and having its central portion vertically spaced from said axle, a vertical post rigidly secured to both said axle and axle bridge, a torque tube, a bolster secured to said torque tube, a semi-circular unbroken surfaced bearing plate secured to the bottom of said torque tube, a semi-circular unbroken surfaced bearing plate secured to the top of said axle bridge, a pierced bearing ear secured to the front of said bolster in a horizontal position; a pierced bearing ear secured to said axle bridge, a pierced bearing ear secured to said vertical post near its bottom, a brace bar secured to said torque tube and extending down and forward to a point under the pierced bearing ear secured to said bolster; said brace bar having a hole in its forward end, a pin extending through said bearing ears and the hole in said brace bar, a pair of vertically arranged pierced bearing ears secured to opposite sides of said vertical post, vertically positioned bearing ears secured to opposite ends of said axle bridge, a tongue, a pair of spaced bearing ears secured to and extending beyond the rear end of said tongue, a pair of diagonal brace bars secured to opposite sides of said tongue near its rear and extending to the rear of said tongue and spaced laterally therefrom; said diagonal brace bars having holes in their outer ends, and a pair of hinge rods each extending through the vertical bearing ears on said vertical post, said axle bridge and said tongue and through the hole in the end of the one of said diagonal brace bars on one side of said tongue; whereby said tongue is hingedly secured to said wagon chassis front axle to permit movement of said tongue in a vertical arc.

2. In a wagon chassis, an axle, an axle bridge secured to the axle and having its central portion vertically spaced from said axle, a vertical post rigidly secured to both said axle and axle bridge, a torque tube, a bolster secured to said torque tube, a semi-circular unbroken surfaced bearing plate secured to the bottom of said torque tube, a second semi-circular unbroken surfaced bearing plate secured to the top of said axle bridge, a pierced bearing ear secured to the front of said bolster in a horizontal position; a pierced bearing ear secured to said axle bridge, a pierced bearing ear secured to said vertical post near its bottom, a brace bar secured to said torque tube and extending down and forward to a point under the pierced bearing ear secured to said bolster; said brace bar having a hole in its forward end, a pin extending through said bearing ears and the hole in said brace bar, a pair of vertically arranged pierced bearing ears secured to opposite sides of said vertical post, vertically positioned bearing ears secured to opposite ends of said axle bridge, a tongue, a pair of spaced bearing ears secured to and extending beyond the rear end of said tongue, a pair of diagonal brace bars secured to opposite sides of said tongue near its rear and extending to the rear of said tongue and spaced laterally therefrom; said diagonal brace bars having holes in their outer ends, and a pair of hinge rods each extending through the vertical bearing ears on said vertical post, said axle bridge and said tongue and through the hole in the end of the one of said diagonal brace bars on one side of said tongue; whereby said tongue is hingedly secured to said wagon chassis front axle to permit movement of said tongue in a vertical arc.

3. In a wagon chassis, an axle, an axle bridge secured to the axle and having its central portion vertically spaced from said axle, a vertical post rigidly secured to both said axle and axle bridge, a torque tube, a bolster secured to said torque tube, a semi-circular unbroken surfaced bearing plate secured to said torque tube, a semi-circular unbroken surfaced bearing plate secured to said axle bridge, a means for pivotally connecting said bolster and said axle bridge together, a pair of vertically arranged pierced bearing ears secured to opposite sides of said vertical post, vertically positioned bearing ears secured to opposite ends of said axle bridge, a tongue, a pair of spaced bearing ears secured to and extending beyond the rear end of said tongue, a pair of diagonal brace bars secured to opposite sides of said tongue near its rear and extending to the rear of said tongue and spaced laterally therefrom; said diagonal brace bars having holes in their outer ends, and a pair of hinge rods each extending through the vertical bearing ears on said vertical post, said axle bridge and said tongue and through the hole in the end of the one of said diagonal brace bars on one side of said tongue; whereby said tongue is hingedly secured to said wagon chassis front axle to permit movement of said tongue in a vertical arc.

4. In a wagon chassis, an axle, an axle bridge secured to the axle and having its central portion vertically spaced from said axle, a vertical post rigidly secured to both said axle and axle bridge, a torque tube, a bolster secured to said torque tube, a semi-circular unbroken surfaced bearing plate secured to said torque tube, a semi-circular unbroken surfaced bearing plate secured to said axle bridge, a pierced bearing ear secured to the front of said bolster in a horizontal position; a pierced bearing ear secured to said axle bridge, a pierced bearing ear secured to said vertical post near its bottom, a brace bar secured to said torque tube and extending down and forward to a point under the pierced bearing ear secured to said bolster; said brace having a hole in its forward end, a pin extending through said bearing ears and the hole in said brace bar, a pair of vertically arranged pierced bearing ears secured to opposite sides of said vertical post, vertically positioned bearing ears secured to opposite ends of said axle bridge, a tongue, a pair of spaced bearing ears secured to and extending beyond the rear end of said tongue, a pair of diagonal brace bars secured to opposite sides of said tongue near its rear and extending to the rear of said tongue and spaced laterally therefrom; said diagonal brace bars having holes in their outer ends, and a pair of hinge rods each extending through the vertical bearing ears on said vertical post, said axle bridge and said tongue and through the hole in the end of the one of said diagonal brace bars on one side of said tongue; whereby said tongue is hingedly secured to said wagon chassis front axle to permit movement of said tongue in a vertical arc.

References Cited in the file of this patent

UNITED STATES PATENTS

| Number | Name | Date |
|---|---|---|
| 1,182,572 | Knapp | May 9, 1916 |